US010165003B2

(12) United States Patent
Kadashevich et al.

(10) Patent No.: US 10,165,003 B2
(45) Date of Patent: *Dec. 25, 2018

(54) IDENTIFYING AN IMPOSTER ACCOUNT IN A SOCIAL NETWORK

(71) Applicant: INTERNATIONAL BUSINESS MACHINES CORPORATION, Armonk, NY (US)

(72) Inventors: A. Julie Kadashevich, Tyngsboro, MA (US); Jane B. Marcus, Medford, MA (US); Jessica L. Piziak, Pelham, NH (US); Purvi K. Trivedi, Littleton, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/856,967

(22) Filed: Dec. 28, 2017

(65) Prior Publication Data

US 2018/0124107 A1    May 3, 2018

Related U.S. Application Data

(63) Continuation of application No. 15/440,893, filed on Feb. 23, 2017, which is a continuation of application
(Continued)

(51) Int. Cl.
*H04L 29/06* (2006.01)
*G06F 21/55* (2013.01)
*H04L 29/08* (2006.01)

(52) U.S. Cl.
CPC ........ *H04L 63/1466* (2013.01); *G06F 21/552* (2013.01); *H04L 63/08* (2013.01);
(Continued)

(58) Field of Classification Search
CPC ............ G06F 21/552; G06F 2221/034; G06F 2221/2117; G06F 9/44589; G06Q 10/02;
(Continued)

(56) References Cited

U.S. PATENT DOCUMENTS 8,484,744 B1 * 7/2013 De .................... G06F 21/6245
726/26
9,027,134 B2 * 5/2015 Foster ................... G06F 21/60
726/22
(Continued)

OTHER PUBLICATIONS

Hassan Takabi et. al, Towards Active Detection of Identity Clone Attacks on Online Social Networks, Proceedings of the first ACM conference on Data and application security and privacy, Feb. 21, 2011, 27-38, ISBN-13: 9781450304665, ACM, San Antonio, TX, USA.
(Continued)

*Primary Examiner* — Joseph P Hirl
*Assistant Examiner* — Sayed Aresh Beheshti Shirazi
(74) *Attorney, Agent, or Firm* — Fabian VanCott; Steven L. Nichols

(57) ABSTRACT

A method for identifying an imposter account in a social network includes a monitoring engine to monitor user accounts of a social network, an identifying engine to identify attributes associated with each of the user accounts of the social network, a matching engine to match the attributes associated with each of the user accounts of the social network, a determining engine to determine when one of the user accounts is an imposter account associated with identity theft of a victim account, a calculating engine to calculate a threshold, and an executing engine to execute an action against the identity theft of the victim account by the imposter account.

20 Claims, 9 Drawing Sheets

Related U.S. Application Data

No. 14/538,505, filed on Nov. 11, 2014, now Pat. No. 9,648,030.

(52) U.S. Cl.
CPC ...... *H04L 63/1408* (2013.01); *H04L 63/1483* (2013.01); *H04L 67/306* (2013.01); *G06F 2221/034* (2013.01); *G06F 2221/2117* (2013.01)

(58) Field of Classification Search
CPC ....... H04L 12/54; H04L 29/06; H04L 51/043; H04L 51/20; H04L 51/32; H04L 63/1408; H04L 63/1466; H04L 63/1483; H04L 67/306
See application file for complete search history.

(56) References Cited

U.S. PATENT DOCUMENTS

| | | | | |
|---|---|---|---|---|
| 9,055,097 | B1* | 6/2015 | Foster | H04L 63/1433 |
| 9,070,088 | B1* | 6/2015 | Baveja | G06F 21/316 |
| 9,191,411 | B2* | 11/2015 | Foster | H04L 63/20 |
| 2013/0139236 | A1* | 5/2013 | Rubinstein | H04L 63/1483 726/7 |
| 2014/0208424 | A1* | 7/2014 | Hudack | G06F 21/316 726/23 |
| 2014/0282977 | A1* | 9/2014 | Madhu | G06Q 50/265 726/7 |
| 2014/0325662 | A1* | 10/2014 | Foster | H04L 63/20 726/25 |
| 2014/0337972 | A1* | 11/2014 | Foster | G06F 21/60 726/22 |
| 2015/0188941 | A1* | 7/2015 | Boshmaf | H04L 63/1441 726/22 |
| 2015/0229666 | A1* | 8/2015 | Foster | H04L 63/14 726/22 |

OTHER PUBLICATIONS

List of IBM Patents or Patent Applications Treated as Related; Dec. 28, 2017.

* cited by examiner

IDENTIFYING AN IMPOSTER ACCOUNT IN A SOCIAL NETWORK

BACKGROUND

The present invention relates to identifying an imposter account, and more specifically, identifying an imposter account in a social network.

A social network is a network based application to enable a user to create a user account. Once the user account is created, the user establishes connections with other users, such as friends, family, and colleagues in an online environment. Further, once the user is connected with other users, the user may share information with each of the other users on the social network by uploading pictures, updating personal information, updating status information, commenting on other user's information, among other activities.

BRIEF SUMMARY

A method for identifying an imposter account in a social network includes monitoring user accounts of a social network, identifying attributes associated with each of the user accounts of the social network, determining when at least one of the user accounts is an imposter account associated with identity theft of a victim account, and executing at least one action against the identity theft of the victim account by the imposter account.

A system for identifying an imposter account in a social network includes a monitoring engine to monitor user accounts of a social network, an identifying engine to identify attributes associated with each of the user accounts of the social network, a matching engine to match the attributes associated with each of the user accounts of the social network, a determining engine to determine when one of the user accounts is an imposter account associated with identity theft of a victim account, a calculating engine to calculate a threshold, and an executing engine to execute an action against the identity theft of the victim account by the imposter account.

A computer program product includes a computer readable storage medium, the computer readable storage medium having computer readable program code embodied therewith. The computer readable program code having computer readable program code to monitor user accounts of a social network, identify attributes associated with each of the user accounts of the social network, match the attributes associated with each of the user accounts of the social network, determine when a user account is an imposter account associated with identity theft of a victim account, and execute an action against the identity theft of the victim account by the imposter account

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
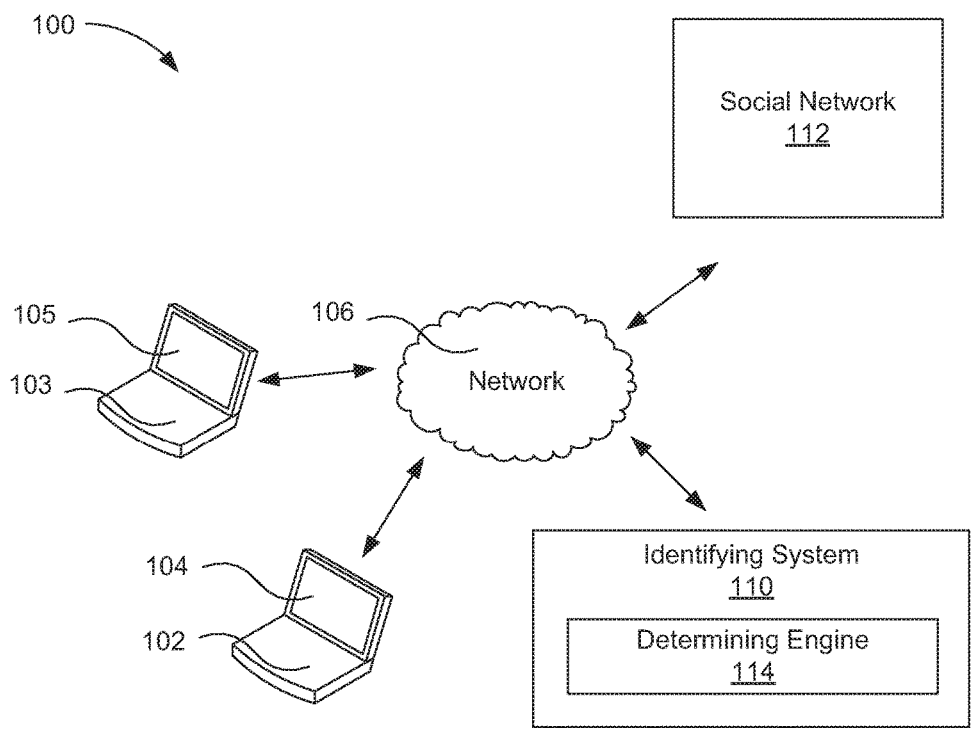
FIG. 1 is a diagram of an example of a system for identifying an imposter account in a social network, according to one example of the principles described herein.

The present specification describes a method and system for identifying an imposter account in a social network, such that the method or system may take at least one action against the imposter account.

The present invention may be a system, a method, and/or a computer program product. The computer program product may include a computer readable storage medium (or media), having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus, to produce a machine such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or blocks or block diagram.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, a social network is a network based application to enable a user to create a user account. Once the user account is created, the user establishes connections with other users, such as friends, family, and colleagues in an online environment. Further, once the user is connected with other users, the user may share information with each of the other users on the social network by uploading pictures, updating personal information, updating status information, commenting on other user's information, among other activities.

An imposter may create an imposter account in the social network to resemble a user account already created in the social network. In one example, an imposter may copy information from the user account to create the imposter account. The information includes making connections with other user accounts connected to the user account, using images associated with the user account, and using a user name associated with the user account. Once this information is copied and used to create an imposter account, the imposter may use the imposter account for nefarious purposes. For example, the imposter uses the imposter account to gain the trust of other user accounts that have established connections with the user account for personal gain. As a result, the imposter may use the imposter account to exploit the relationship of the user account with other users for personal gain by, for example, requesting money be transferred for a fictitious emergency.

The principles described herein include a system and a method for identifying an imposter account in a social network. A system and method includes monitoring user accounts of a social network, identifying attributes associated with each of the user accounts of the social network, determining, based on matching the attributes associated with each of the user accounts of the social network, when at least one of the user accounts is an imposter account associated with identity theft of a victim account, and executing, based on a threshold, at least one action against the identity theft of the victim account by the imposter account. Such a method and system allows the identity theft by the imposter account to be reduced or eliminated.

In the present specification and appended claims, the term "identity theft" means an act of an imposter stealing a user's identity via an imposter account in a social network. The imposter may steal the user identity on a social network by creating an imposter account to resemble a user account.

In the present specification and appended claims, the term "attributes" means information associated with a user to define a user account on a social network. Examples of attributes include a user name, an electronic mail (email) address, a user profile picture, user residence, an employment history, user education, user preferences, life events, account age, social contacts, other attributes, or combinations thereof.

In the present specification and appended claims, the term "imposter account" means a user account that is created by another user, such as an imposter, to resemble a user account. The imposter account may include several attributes associated with the user account. As a result, the imposter uses the imposter account to steal the identity of the user associated with the user account.

In the present specification and appended claims, the term "victim account" means a user account that has had its identity stolen by an imposter account in a social network. In an example, the victim account's attributes and the imposter account's attributes are similar.

In the present specification and appended claims, the term "rules" means a mechanism to determine if an imposter account is stealing the identity of the victim account. Rules may be based on attributes, activity on the social network, or combinations thereof. For example, a rule may be triggered if an attribute matches in two user accounts. A rule may be triggered if a suspected imposter account initiates a chat with a connection of a victim account.

In the present specification and appended claims, the term "threshold" means a defined number of rules to be triggered before executing an action against an imposter account. The threshold may define that at least one rule is to be triggered before executing an action against the imposter account.

As used in the present specification and appended claims, the term "action" is meant to be broadly understood as a method, routine, or computer implemented code that causes an event to occur against identity theft to impact the imposter account. An action may include suspending an imposter account, marking an imposter account, notifying a user, notifying a social network administrator, other actions, or combinations thereof.

As used in the present specification and in the appended claims, the term "a number of" or similar language may include any positive number, including one to infinity; zero not being a number, but the absence of a number.

In the following description, for purposes of explanation, numerous specific details are set forth in order to provide a thorough understanding of the present systems and methods. It will be apparent, however, to one skilled in the art, that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for identifying an imposter account in a social network, according to one example of principles described herein. As will be described below, an identifying system is in communication with a network to monitor user accounts of a social network. In one example, the identifying system identifies attributes associated with each of the user accounts of the social network. The identifying system determines, based on matching the attributes associated with each of the user accounts of the social network, when at least one of the user accounts is an imposter account associated with identity theft of a victim account. Further, the identifying system executes, based on a threshold, at least one action against the identity theft of the victim account by the imposter account.

As illustrated in FIG. 1, the system (100) includes a social network (112). The social network (112) enables users to create user accounts. The users may create users accounts via a user device (102). During creation of a user account, a user may specify one or more attributes via displays (104) of a user device (102). The attributes may include a user name, an email address, a profile picture, contact information, other attributes, or combinations thereof. Once the user account is created, the user establishes connections with other users, such as friends, family, and colleagues in an online environment of the social network (112). Further, once the user is connected with other users, the user may share information with each of the other users on the social network (112) by uploading pictures, updating personal information, updating status information, commenting on other user's information, among other activities. As will be described in other parts of this specification, an imposter may use a user device (103) to create an imposter account.

Further, the system includes an identifying system (110). The identifying system (110) monitors user accounts of a social network (112). The identifying system (110) monitors email addresses associated with each of the user accounts. Further, the identifying system (110) monitors user names associated with each of the user accounts.

The identifying system (110) further identifies attributes associated with each of the user accounts of the social network (112). In one example, the identifying system (110) identifies attributes such as a user name, user profile picture, user email address for each of the user accounts, other attributes, or combinations thereof.

As illustrated the identifying system (110) includes a determining engine (114). The determining engine (114) determines, based on matching the attributes associated with each of the user accounts of the social network, when at least one of the user accounts is an imposter account associated with identity theft of a victim account. In one example, the determining engine (114) determines, based on match attributes associated with each of the user accounts, that two user accounts have similar attributes. For example, a first user account and a second account have the same user name and user profile picture, but have different email addresses. As a result, the determining engine (114) determines one of the user accounts may be an imposter account that stole the identity of another user account on the social network (112). In this example, the determining engine (114) determines the first user account is a victim account that has had their identity stolen and the second user account is an imposter account.

Further, the identifying system (110) executes, based on a threshold, an action against the identity theft of the victim account by the imposter account. The action may suspend the imposter account to prevent further identity theft. The action may send a message to the user of the victim account through a messaging service indicating there may be an identity theft attempt by the imposter account. The action may mark the imposter account so other users are alerted to the possibility of the identity theft.

While this example has been described with reference to the identifying system being operated over the network, the identifying system may be stored and operated locally on a single machine. For example, the identifying system may be integrated into a user or client device, a server, a database, other locations, or combinations thereof.

Figure 2:
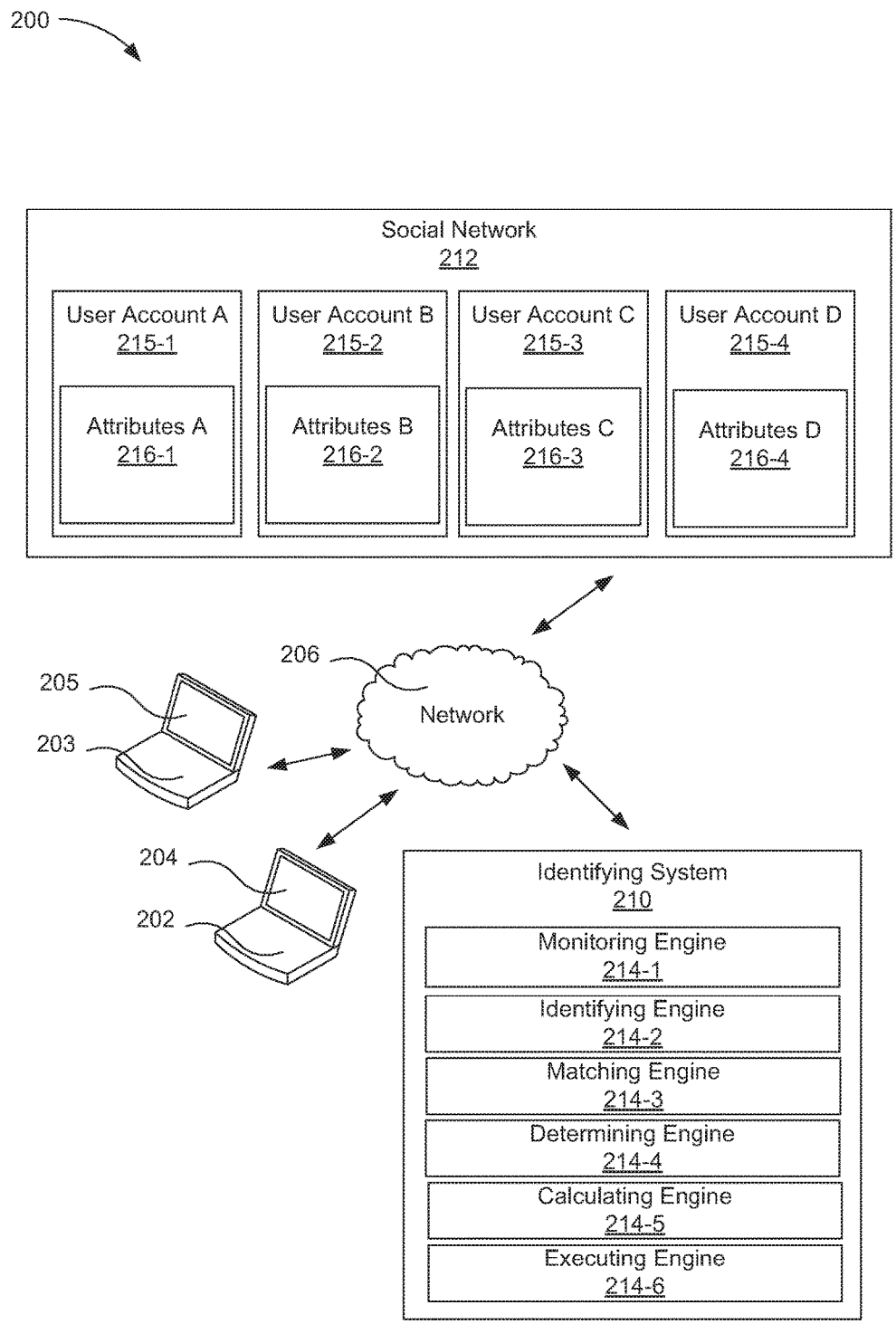
FIG. 2 is a diagram of an example of a system for identifying an imposter account in a social network, according to one example of the principles described herein.

FIG. 2 is a diagram of an example of a system for identifying an imposter account in a social network, according to one example of the principles described herein. As will be described below, an identifying system is in communication with a network to monitor user accounts of a social network. The identifying system identifies attributes associated with each of the user accounts of the social network. The identifying system determines, based on matching the attributes associated with each of the user accounts of the social network, when at least one of the user accounts is an imposter account associated with identity theft of a victim account. The identifying system executes, based on a threshold, at least one action against the identity theft of the victim account by the imposter account.

As illustrated in FIG. 2, the system (200) includes a social network (212). The social network (212) may include a number of user accounts (215). As mentioned above, the user accounts (215) may be created via a first user device (202). The social network (212) may include user account A (215-1), user account B (215-2), user account C (215-3), and user account D (215-4). Further, each of the user accounts (215) may be associated with a number of attributes (216). The attributes (216) may include user names, user profile pictures, user residences, employment histories, user education, user preferences, life events, account age, social contacts, or combinations thereof. As illustrated, user account A (215-1) includes attributes A (216-1). Attributes A (216-1) include a user name, user profile picture, life events, and other attributes. Similarly, User account B (215-2) includes attributes B (216-2). Attributes B (216-2) include a user name, user profile picture, life events, and other attributes. User account C (215-3) includes attributes C (216-3). Attributes C (216-3) include a user name, user profile picture, life events, and other attributes. User account D (215-4) includes attributes D (216-4). Attributes D (216-4) include a user name, user profile picture, life events, and other attributes. As a result, the attributes (216) for each of the user accounts (215) define each of the user accounts (215) and are used to distinguish each of the user accounts (215) from one another.

As illustrated, the system (200) includes an identifying system (210). The identifying system (210) includes a number of engines (214). The engines (214) refer to a combination of hardware and program instructions to perform a designated function. Each of the engines (214) may include a processor and memory. The program instructions are stored in the memory and cause the processor to execute the designated function of the engine. As illustrated, the identifying system (210) includes a monitoring engine (214-1), an identifying engine (214-2), a matching engine (214-3), a determining engine (214-4), a calculating engine (214-5), and an executing engine (214-6).

As mentioned above, the identifying system (210) includes a monitoring engine (214-1). The monitoring engine (214-1) monitors user accounts of a social network (212). The monitoring engine (214-1) may communicate with the social network (212) through a network (206). In one example, the monitoring engine (214-1) monitors the creation of the user accounts (215). Further, the monitoring engine (214-1) monitors modifications to the user accounts (215). The monitoring engine (214-1) may monitor user names and email addresses associated with the user accounts (215) of the social network (212).

The identifying engine (214-2) identifies attributes (216) associated with each of the user accounts (215) of the social network (212). In one example, the identifying engine (214-2) may identify user names, email addresses, occurrences of user name, profile picture, and account age for identification purposes.

As illustrated, the identify system (210) includes the matching engine (214-3). The matching engine (214-3) matches the attributes (216) associated with each of the user accounts of the social network (212). In one example, the matching engine (214-3) matches the user names, email addresses, and occurrences of the user name. For example, the matching engine (214-3) determines if attributes A (216-1) match attributes D (216-4). In this example, the matching engine (214-3) matches a user name of attributes A (216-1) with a user name of attributes D (216-4). The matching engine (214-3) matches a user profile picture of attributes A (216-1) with a user profile picture of attributes D (216-4).

As mentioned above, the identifying system (210) includes the determining engine (214-4). The determining engine (214-4) determines, based on matching the attributes associated with each of the user accounts of the social network (212), when at least one of the user accounts is an imposter account associated with identity theft of a victim account. The determining engine (214-4) may reference attributes such as the account age or occurrence of the user name for each of the user accounts (215). The determining engine (214-4) may determine, based on matching the attributes associated with each of the user accounts of the social network (212), when at least one of the user accounts is an imposter account associated with the identity theft of the victim account by determining a number of rules which are to be triggered to determine when at least one of the user accounts is an imposter account associated with the identity theft of the victim account. Rules may be based on attributes, activity on the social network, or combinations thereof. For example, a rule may be triggered if an attribute matches in two user accounts. A rule may be triggered if a suspected imposter account initiates an activity, such as a chat, with a connection of a victim account.

As illustrated, the identifying system (210) includes a calculating engine (214-5). The calculating engine (214-5) calculates a threshold, the threshold indicating a number of rules that are to be triggered before executing at least one action. The identifying system (210) may establish a number of rules that are triggered before identifying an account as an imposter account. In one example, a rule may be triggered when two accounts with the same user name and same user profile picture have different profile pictures. In another example, a rule may be triggered when two accounts have the same user name, different email addresses, and one account has a user profile picture that matches the facial recognition of the other account.

The calculating engine (214-5) may increase the number of rules that are triggered to avoid false identification on imposter accounts. In one example, the calculating engine (214-5) may use the occurrence of the user name to determine that a user account is an imposter account. A user name with a high frequency of occurrence may use more information than the user name and user profile picture to calculate that identity theft has occurred. A user name with a high frequency of occurrence may additionally need to match user employment history. The calculating engine (214-5) may decrease the number of rules that are triggered to more easily detect an imposter account.

As illustrated, the identifying system (210) includes the executing engine (214-6). The executing engine (214-6) executes, based on the threshold, at least one action against the identity theft of the victim account by the imposter account. The action may include suspending an imposter account, marking an imposter account, notifying a user, notifying a social network administrator, other actions, or combinations thereof.

An overall example of FIG. 2 will now be described. In one example, a user creates user account A (215-1) via a first user device (202). The user specifies attributes. The attributes may be stored on the social network (212) as attributes A (216-1). In an example, attributes A (216-1) include a user name, an email address, user profile pictures, user residences, employment histories, user education, user preferences, life events, account age, social contacts, or combinations thereof. Further, the user establishes connections with users associated with user account B (215-2) and user account C (215-3).

An imposter creates user account D (215-1) via a second user device (203). The imposter specifies attributes to attempt to steal the identity of the user associated with user account A (215-1). The attributes may be stored on the social network (212) as attributes D (216-4). Attributes D (216-4) include a user name, user profile pictures, user residences, employment histories, user education, user preferences, life events, account age, social contacts, or combinations thereof that match attributes A (216-1). For example, the user of user account D (215-4) may copy the user name, user profile pictures, user residences, employment histories, user education, user preferences, life events, or a combination thereof from user account A (215-1) for identify theft purposes. As a result, the imposter associated with user account D (215-4) attempts to make user account D (215-4) appear to be the same as user account A (215-1) via attributes D (216-4). The imposter then attempts to establish connections with user account B (215-2) and user account C (215-3). As mentioned above, user account B (215-2) and user account C (215-3) have established connections with user account A (215-1). The users of user account B (215-2) and user account C (215-3) may think that a technical error disconnected them from user account A (215-1). As a result, user account B (215-2) and user account C (215-3) may accept a connection from user account D (215-4).

As will be described below, the identifying system (210) identifies user account D (215-4) as an imposter account in the social network (212). Further, the identifying system (210) may take at least one action against user account D (215-4) to prevent further identity theft of user account A (215-4).

As mentioned above, the identifying system (210) includes a monitoring engine (214-1) to monitor the user accounts (215) of a social network (212). The monitoring engine (214-1) monitors the creation of the user accounts (215). The identifying engine (214-2) of the identifying system (210) identifies attributes (216) associated with each of the user accounts (215) of the social network (212). The matching engine (214-3) matches the attributes (216) associated with each of the user accounts (215) of the social network (212). In an example, the matching engine (214-3) matches the user name in attributes A (216-1) with the user name in attributes D (216-4). The matching engine (214-3) matches the user profile picture in attributes A (216-1) with the user profile picture of attributes D (216-4). The matching engine (214-3) determines there is not a match of the user email address in attributes A (216-1) and the user email address in attributes D (216-4). The determining engine (214-4) of the identifying system (210) determines, based on matching the attributes (216) associated with each of the user accounts (215) of the social network (212), when at least one of the user accounts (215) is an imposter account associated with identity theft of a victim account. The match of the user name and profile picture with a different user email address may indicate that user account D (215-4) is an imposter account and is attempting to steal the identity of the user associated with user account A (215-1). The calculating engine (214-5) calculates a threshold, the threshold indicating a number of rules that are to be triggered before executing at least one action. The calculating engine (214-5) calculates that at least two rules are to be triggered before executing at least one action. In this example, a rule is triggered each time if there are matching attributes such as a common user name and a common user profile picture for the user accounts (215). In other examples, the rule is based on user activity. The executing engine (214-6) of the identifying system (210) executes, based on the threshold, at least one action against the identity theft of the victim account by the imposter account. In this example, since the threshold has been reached, user account D (215-4) is suspended. As a result, user account D (215-4) cannot be accessed.

Figure 3:
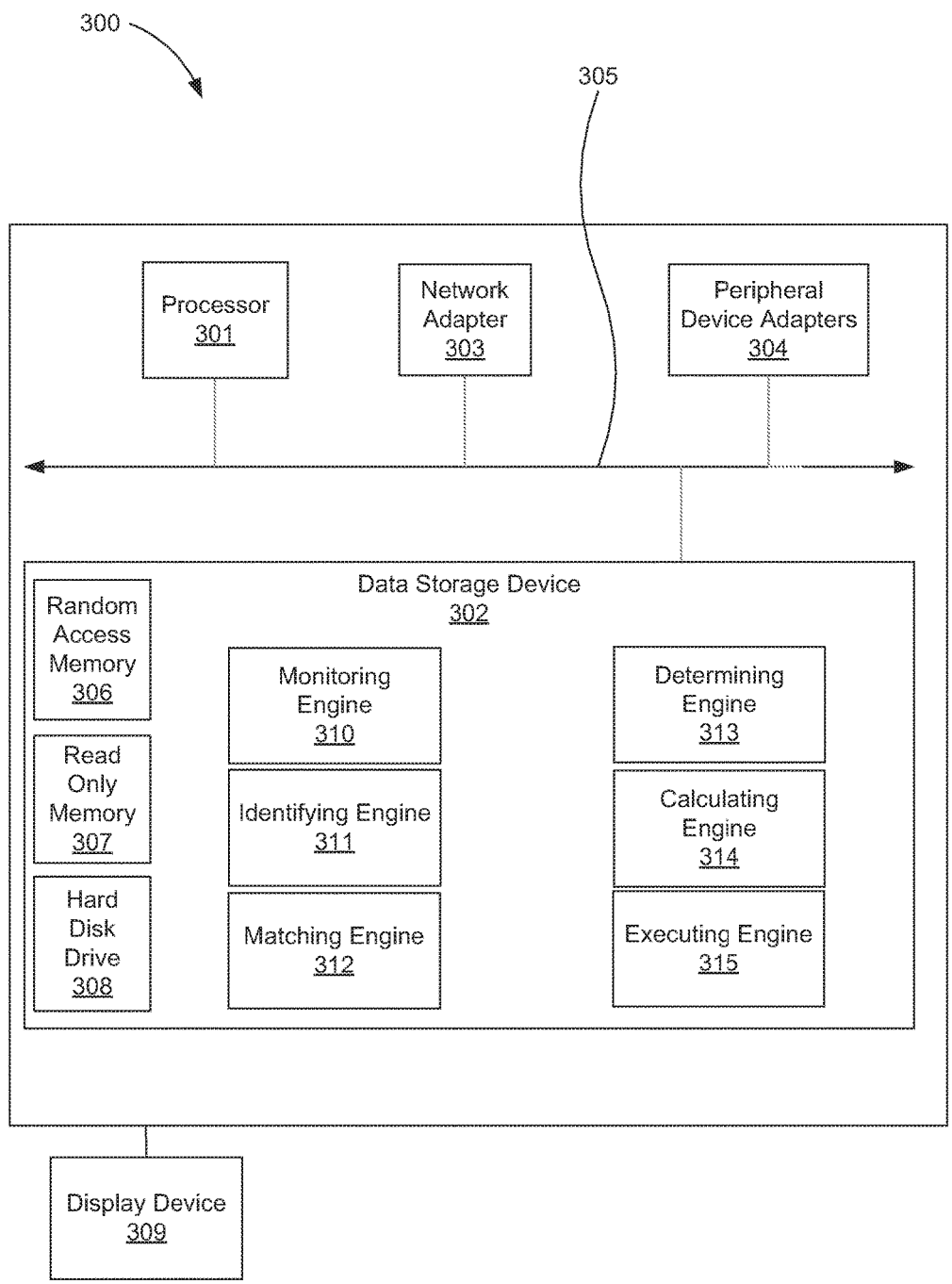
FIG. 3 is a diagram of an example of a computer program product for identifying a social imposter in a social network, according to the principles described herein.

FIG. 3 represents a computing device for identifying an imposter account in a social network, according to one example of the principles described herein. The computing device (300) for managing data in a distributed computing environment may be implemented in an electronic device. Examples of electronic devices include servers, desktop computers, laptop computers, personal digital assistants (PDAs), mobile devices, smartphones, gaming systems, and tablets, among other electronic devices.

The computing device (300) may be utilized in any data-processing scenario, including stand-alone hardware, mobile applications, a computing network, or combinations thereof. Further, the computer (300) may be used in a computing network, a public cloud network, a private cloud network, a hybrid cloud network, other forms of networks, or combinations thereof. In one example, the methods provided by the computing device (300) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; application program interface (API) as a service (APIaaS), other forms of network services, or combinations thereof. The present systems may be implemented on one or multiple hardware platforms, in which the engines in the system can be executed on one or across multiple platforms. Such engines can run on various forms of cloud technologies and hybrid cloud technologies or offered as a SaaS (Software as a service) that can be implemented on or off the cloud. In another example, the methods provided by the computing device (300) are executed by a local administrator.

To achieve its desired functionality, the computing device (300) may include various hardware components. Among these hardware components may be a number of processors (301), a number of data storage devices (302), a number of peripheral device adapters (304), and a number of network adapters (303). These hardware components may be interconnected through the use of a number of buses and/or network connections. In one example, the processor (301), data storage device (302), peripheral device adapters (304), and a network adapter (303) may be communicatively coupled via a bus (305).

The data storage device (302) may store data, such as executable program code, that is executed by the processor (301) or other processing device. As will be discussed, the data storage device (302) may specifically store computer code representing a number of applications that the processor (301) executes to implement at least the functionality described herein.

The data storage device (302) may include various types of memory modules, including volatile and nonvolatile memory. For example, the displaying system (302) of the present example includes Random Access Memory (RAM) (306), Read Only Memory (ROM) (307), and Hard Disk Drive (HDD) memory (308). Many other types of memory may also be utilized, and the present specification contemplates the use of as many varying type(s) of memory in the data storage device (302) as may suit a particular application of the principles described herein. In certain examples, different types of memory in the data storage device (302) may be used for different data storage needs. For example, in certain examples, the processor (301) may boot from Read Only Memory (ROM) (307), maintain nonvolatile storage in the Hard Disk Drive (HDD) memory (308), and execute program code stored in Random Access Memory (RAM) (306).

Generally, the data storage device (302) may comprise a computer readable medium, a computer readable storage medium, or a non-transitory computer readable medium, among others. For example, the data storage device (302) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (303, 304) in the computing device (300) enable the processor (301) to interface with various other hardware elements, external and internal to the computing device (300). For example, the peripheral device adapters (304) may provide an interface to input/output devices, such as, for example, a display device (309), a mouse, or a keyboard. The peripheral device adapters (303) may also provide access to other external devices, such as an external storage device, a number of network devices such as, for example, servers, switches, and routers, client devices, other types of computing devices, and combinations thereof.

The display device (309) may be provided to allow a user of the computing device (300) to interact with and implement the functionality of the computing device (300). The peripheral device adapters (304) may also create an interface between the processor (301) and the display device (309), a printer, or other media output devices. The network adapter (303) may provide an interface to other computing devices within, for example, a network, thereby enabling the transmission of data between the computing device (300) and other devices located within the network.

The computing device (300) may, when executed by the processor (301), display the number of graphical user interfaces (GUIs) on the display device (309) associated with the executable program code, representing the number of applications stored on the data storage device (302). The GUIs may include aspects of the executable code, including displaying a number of messages to a user. The GUIs may display, for example, a message that an account has been identified as a victim account and a different account has been identified as an imposter account. Additionally, a user may control when an action is taken against the imposter account. Examples of display devices (309) include a computer screen, a laptop screen, a mobile device screen, a personal digital assistant (PDA) screen, and a tablet screen, among other display devices (309). Examples of the GUIs displayed on the display device (309) will be described in more detail below.

The computing device (300) may include a number of engines used in the implementation of the management system for data in a distributed environment. The various engines within the computing device (300) comprise executable program code that may be executed separately. In this example, the various engines may be stored as separate computer program products. In another example, the various engines within the computing device (300) may be combined within a number of computer program products; each computer program product comprising a number of the engines.

Aspects of the present system and method are described herein with reference to flowchart illustrations and/or block diagrams of methods, apparatus (systems) and computer program products, according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (301) of the computing device (300) or other programmable data processing apparatus, implements the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The computing device (300) may include a monitoring engine (310) made to, when executed by the processor (310), monitor user accounts of a social network. An identifying engine (311) may identify attributes associated with each of the user accounts of the social network. A matching engine (312) may match the attributes associated with each of the user accounts of the social network. A determining engine (313) may determine, based on matching the attributes associated with each of the user accounts of the social network, when at least one of the user accounts is an imposter account associated with identity theft of a victim account. A calculating engine (314) may calculate a threshold, the threshold indicating a number of rules that are to be triggered before executing at least one action. An executing engine (315) may execute, based on the threshold, the at least one action against the identity theft of the victim account by the imposter account The monitoring engine (310) may monitor user accounts of a social network (FIG. 2, 212). The monitoring engine (310) may periodically check user accounts in the social network (FIG. 2, 212). The monitoring engine (310) may be invoked as a part of the social network (FIG. 2, 212).

The identifying engine (311) may identify attributes associated with each of the user accounts (FIG. 2, 215) of the social network. The identifying engine (311) may identify particular attributes associated with a user account which are more likely to be copied to an imposter account.

The matching engine (312) may match the attributes associated with each of the user accounts of the social network. The matching engine (312) may determine that two or more accounts match user name and user profile picture.

The determining engine (313) may determine, based on matching the attributes associated with each of the user accounts of the social network, when at least one of the user accounts is an imposter account associated with identity theft of a victim account. The determining engine (313) may determine that two user accounts are involved in identity theft when they share a number of the same attributes, such as user name, user profile pictures, user residences, email addresses, user profile pictures, user residences, employment histories, user education, user preferences, social contacts, or a combination thereof. The determining engine (313) may consider the occurrence of the user name in determining that the accounts are involved in identity theft. The determining engine (313) may determine, based on the account age that a more recently created user account is an imposter account and an older user account is a victim account. Similarly, the determining engine (313) may determine the imposter account and victim account based on the amount of time the user accounts have had the same user name.

The calculating engine (314) calculates a threshold, the threshold indicating a number of rules that are to be triggered before executing at least one action. When a rule is triggered, the calculating engine (314) may indicate an action is to be taken. The threshold may indicate a number of rules that when triggered will indicate an action. The calculating engine (314) may provide greater consideration to one rule over a different rule.

The executing engine (315) may execute, based on the threshold, the at least one action against the identity theft of the victim account by the imposter account. The action may include notifying the user of the victim account. The action may include notifying a social network administrator. The action may include suspending the suspected imposter account. The action may include an authentication process by the imposter account to establish that there is no nefarious activity occurring. Other similar actions may be taken to protect the victim account.

Figure 4:
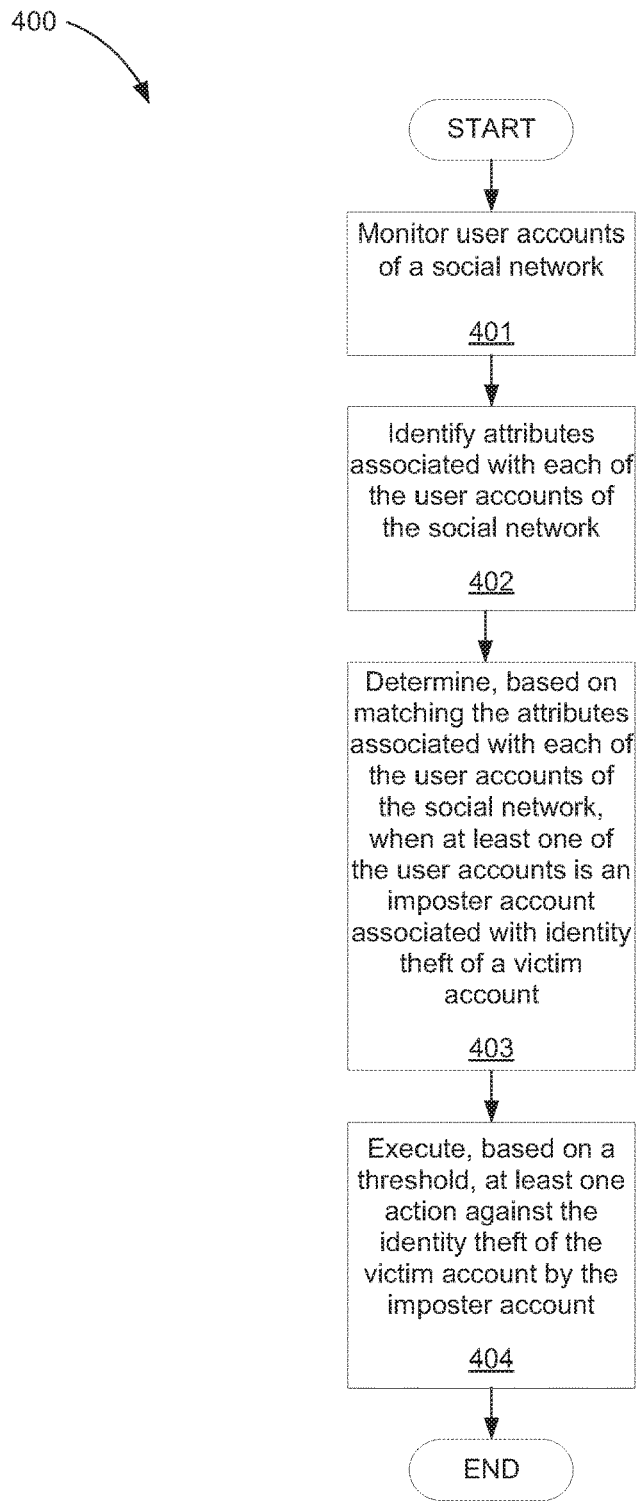
FIG. 4 is a flowchart of an example of a method for identifying an imposter account in a social network, according to one example of principles described herein.

FIG. 4 is a flowchart of an example of a method for identifying an imposter account in a social network, according to one example of principles described herein. In one example, the method (400) may be executed by the identifying system (110) of FIG. 1. In other examples, the method (400) may be executed by other systems (i.e. system 200, system 300, and system 900). In this example, the method (400) includes monitoring (401) user accounts of a social network, identifying (402) attributes associated with each of the user accounts of the social network, determining (403), based on matching the attributes associated with each of the user accounts of the social network, when at least one of the user accounts is an imposter account associated with identity theft of a victim account, and executing (404), based on a threshold, at least one action against the identity theft of the victim account by the imposter account.

As mentioned above, the method (400) includes monitoring (401) user accounts of a social network. The monitoring (401) may periodically monitor the user accounts of the social network. The monitoring (401) may monitor the creation of new user accounts. The monitoring (401) may monitor modified attributes related to a user account. The modified attributes may, for example, include modifications to user names, user profile pictures, user residences, user employment histories, user education, user preferences, life events, social contacts, or combination thereof. The monitoring (401) may include monitoring user names associated with the user accounts and monitoring email addresses associated with the user accounts.

As mentioned above, the method (400) includes identifying (402) attributes associated with each of the user accounts of the social network. Attributes that are prone to use by imposters may be preferred over other attributes. In one example, an imposter uses attributes such as user name and profile picture to deceive other users. As a result, these attributes may be identified by the method (400).

As mentioned above, the method (400) includes determining (403) based on matching the attributes associated with each of the user accounts of the social network, when at least one of the user accounts is an imposter account associated with identity theft of a victim account. The determining (403) may determine that one attribute is more relevant to an imposter than a different attribute. The determining (403) may determine that not all attributes are relevant. As a result, the determining (403) determines that user accounts that share a common user name and user profile picture are more likely to be involved in identity theft than user accounts that share a common employment history and a number of contacts.

As mentioned above, the method (400) includes executing (404), based on a threshold, at least one action against the identity theft of the victim account by the imposter account. The threshold may indicate a number of rules that are to be triggered before executing the at least one action. In some example, the action may include notifying a user of the victim account. The user may be notified via email, a telephone, a user device, a short message service, or combinations thereof. In other examples, the action may include suspending the imposter account. Suspending the imposter account may restrict the imposter from accessing the imposter account. Suspending the imposter account may further include restricting the imposter from accessing services of the social network, such as chat. Further, suspending the imposter account may include restricting the imposter from making further connection with other user of the social network. Still further, suspending the imposter account may include up to the deletion of the imposter account.

Figure 5:
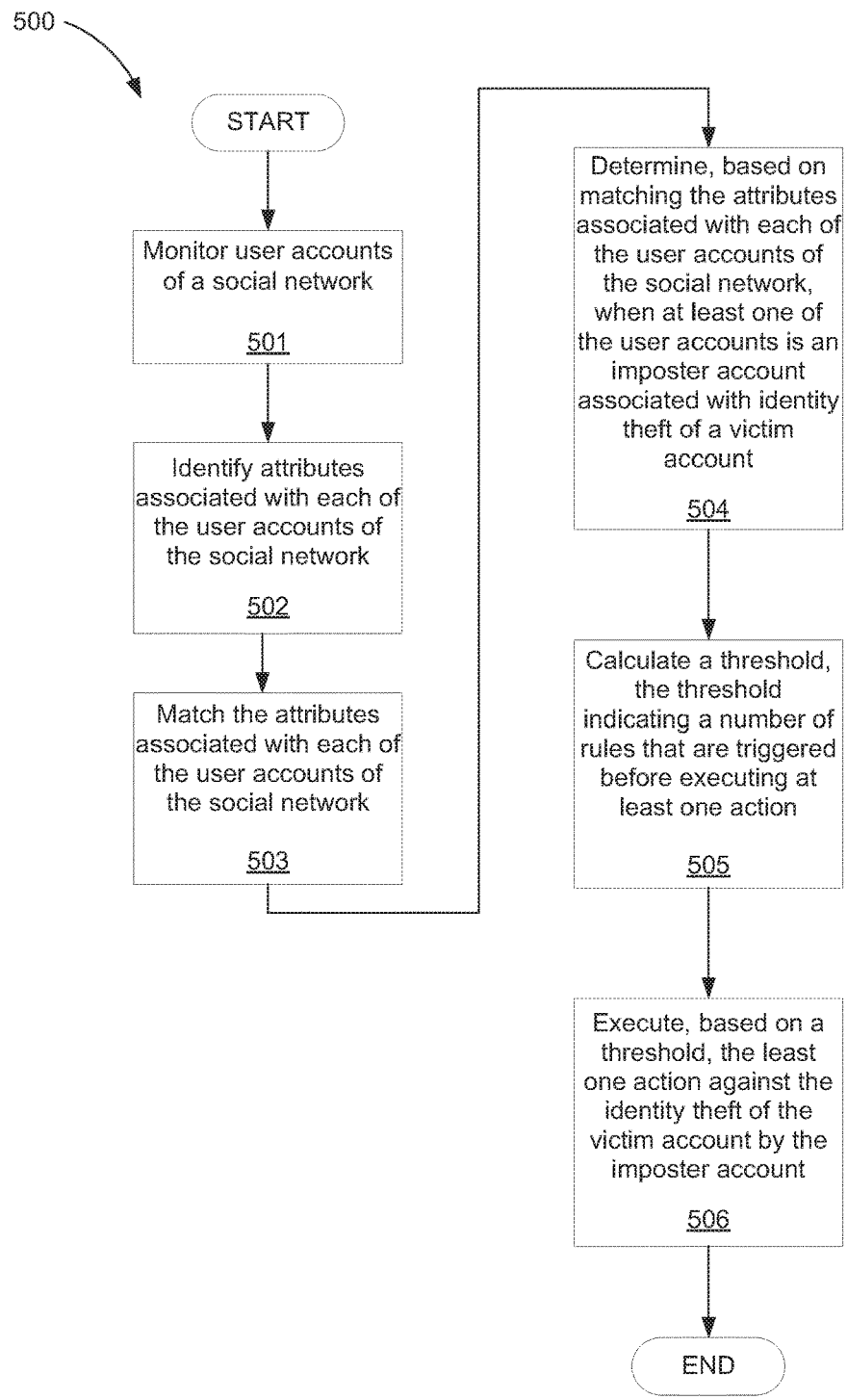
FIG. 5 is a flowchart of an example of a method for identifying an imposter account in a social network, according to one example of principles described herein.

FIG. 5 is a flowchart of an example of a method for identifying an imposter account in a social network, according to one example of principles described herein. In one example, the method (500) may be executed by the identifying system (110) of FIG. 1. In other examples, the method (500) may be executed by other systems (i.e. system 200, system 300, and system 900). In this example, the method (500) includes monitoring (501) user accounts of a social network, identifying (502) attributes associated with each of the user accounts of the social network, matching (503) the attributes associated with each of the user accounts of the social network, determining (504), based on matching the attributes associated with each of the user accounts of the social network, when at least one of the user accounts is an imposter account associated with identity theft of a victim account, calculating (505) the threshold, the threshold indicating a number of rules that are to be triggered before executing the at least one action, and executing (506), based on a threshold, at least one action against the identity theft of the victim account by the imposter account.

As mentioned above, the method (500) includes matching (503) the attributes associated with each of the user accounts of the social network. The matching (503) may need the attributes associated with the user accounts to be an exact match. For example, the matching engine (503) may specify the user names associated with the user accounts be exactly the same. Thus creating a match. In other examples, the matching (503) may allow for some variation of the attributes. An example of a variation may include a common variation on the spelling of a user name.

As mentioned above, the method (500) includes calculating (505) the threshold, the threshold indicating a number of rules that are to be triggered before executing the at least one action. The method (500) may allow a user of a user account to define the threshold. For example, the user may specify, via a user device, the threshold includes a user name, user profile picture, and user employment history to match before invoking an action. In other examples, the method (500) may allow a social network administrator to define the threshold. For example, a social network administrator may indicate that a threshold is met when the user name, user profile picture, and one other attributes are determined to be a match.

Figure 6:
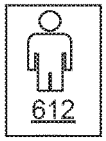
FIG. 6 is a diagram of an example of attributes associated with a victim account and an imposter account, according to one example of principles described herein.
Figure 6:
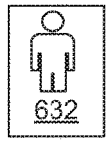

FIG. 6 is a diagram of an example of attributes associated with a victim account and an imposter account, according to one example of principles described herein. As will be described below, a victim account is a user account that has had attributes copied by an imposter, to an imposter account, to try to steal the identity of the user associated with the victim account. In FIG. 6, attributes that are associated with a victim account are described as victim attributes. Further, attributes copied from the victim account are described as imposter attributes.

As illustrated, a victim account (610) includes a number of victim attributes (612 to 622). The victim attributes (612 to 622) include a victim profile picture (612), a victim name (614), a victim email (615), a victim education (616), a victim residences (617), a victim account age (618), a victim employment history (619), a victim user preferences (620), victim life events (621), and victim social contacts (622).

In an example, an imposter creates an imposter account (630) as described above. The imposter account (630) may include one or more victim attributes (614 to 622) that have been copied to the imposter account (630). In this example, the imposter copies all of the victim attributes (612 to 622). As a result, the imposter account (630) includes an imposter profile picture (632), an imposter name (634), an imposter email (635), an imposter education (636), an imposter residences (637), an imposter account age (638), an imposter employment history (639), imposter user preferences (640), imposter life events (641), and imposter social contacts (642).

Figure 7:
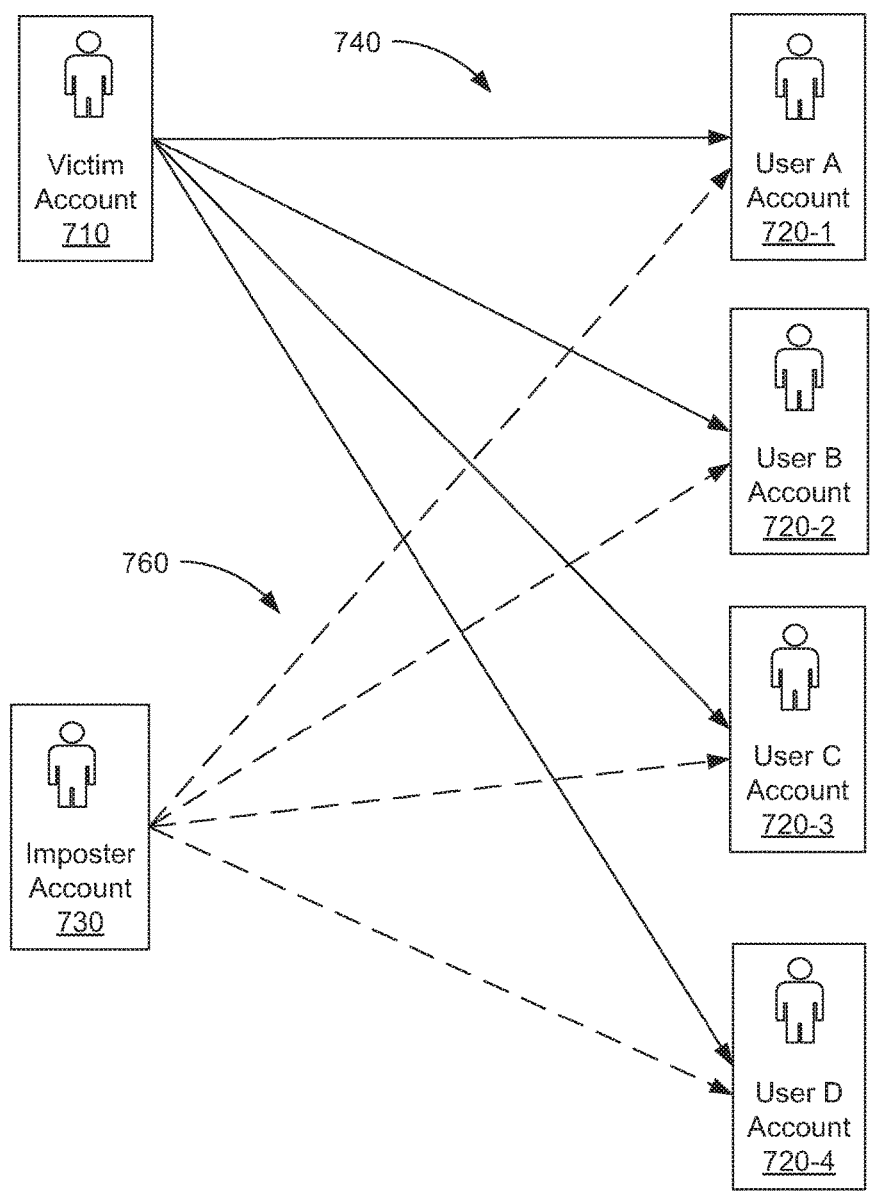
FIG. 7 is a diagram of an example of a user account establishing connections with a number of user accounts, according to one example of principles described herein.

FIG. 7 is a diagram of an example of a user account establishing connections with a number of user accounts, according to one example of principles described herein. Once a user account is created, the user establishes connections with other users, such as friends, family, and colleagues in an online environment. Further, once the user is connected with other users, the user may share information with each of the other users on the social network by uploading pictures, updating personal information, updating status information, commenting on other user's information, among other activities.

As illustrated, a victim account (701) has established connections to a number of other user accounts (720) as indicated by the solid arrows (740). For example, the victim account has established connections to user A account (720-1), user B account (720-2), user C account (720-3), and user D account (720-4). As mentioned in FIG. 6, the imposter account (730) may have copied attributes from the victim account (710) resulting in identity theft. The imposter account (730) then attempts to make connections with user A account (751), user B account (752), user C account (753), and user a D account (754) as indicated by the dashed arrows (760). Users of the user accounts (720) may accept the connection request or reject the connection request from the imposter account (730).

Each request for a connection between the imposter account (730) and a user accounts (720) may trigger rules. As mentioned above, if a number of rules, associated with a threshold, are reached, the identifying system of FIG. 2 executes at least one action.

Figure 8:
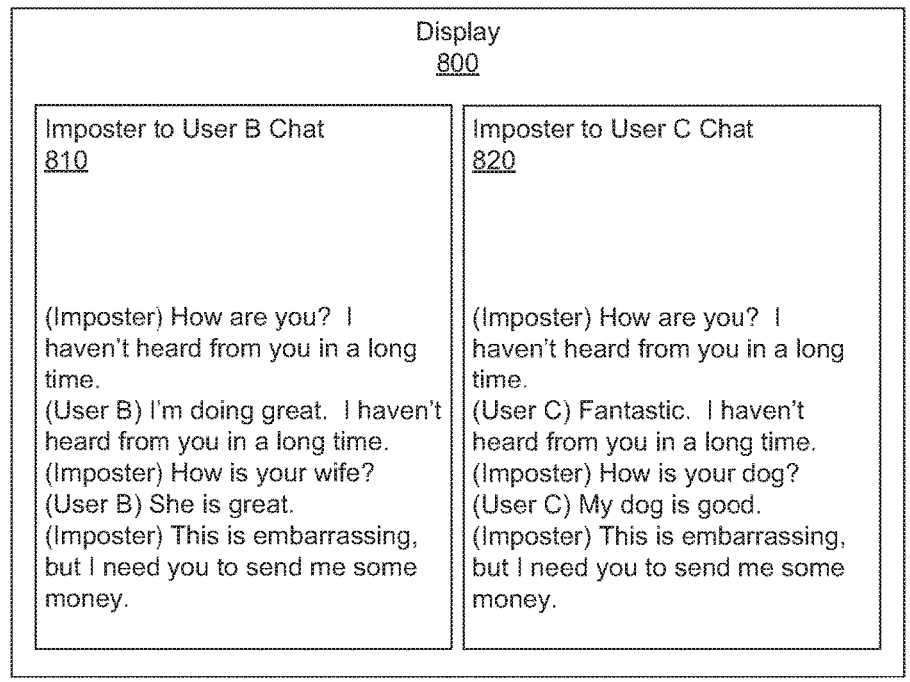
FIG. 8 is a diagram of an imposter initiating a chat with a connection of a victim account, in one example of the principles described herein.

FIG. 8 is a diagram of an imposter initiating a chat with a connection of a victim account, in one example of the principles described herein. Once an imposter creates an imposter account, the imposter may impersonate a user of a victim account via a number of techniques. As will be described below, the imposter impersonates the user via a chat service of the social network.

As mentioned above, an imposter impersonates the user of a user account via a chat service of the social network. The imposter impersonates the user to gain trust of connections associated with the user account. Once the imposter gains trust of the connection, the imposter attempts to exploit the trust for gain.

In one example, the imposter may initiate an imposter to user B chat (810). As illustrated, the imposter greets user B by stating, "How are you? I haven't heard from you in a long time." User B responds, "I'm doing great, I haven't heard from you in a long time." The imposter then uses information, such as if user B is married, gathered from user B's account. The imposter uses this information and asks, "How is your wife?" User B responds with "She is great." The imposter, observing that user B believes he is not an imposter, attempts to exploit this trust by asking "This is embarrassing, but I need you to send me some money." The brief correspondence with user B, culminating in a request for money, may trigger a rule causing the imposter account to exceed a threshold. As mentioned above, once a threshold is reached, an action is executed.

In another example, the imposter may initiate an imposter to user C chat (810). As illustrated, the imposter greets user C by stating, "How are you? I haven't heard from you in a long time." User C responds, "Fantastic, I haven't heard from you in a long time." As mentioned above, the imposter uses information, such as if user C has a pet, gathered from user C's account. The imposter uses this information and asks, "How is your dog?" User B responds with "My dog is good." The imposter attempts to exploit this trust by asking, "This is embarrassing, but I need you to send me some money." The brief correspondence with User C, culminating in a request for money, may trigger a rule causing the imposter account to exceed a threshold. As mentioned above, once a threshold is reached, an action is executed. The combination of the imposter to user B chat (810) and imposter to user C chat (820) in a close proximity of time may further trigger an additional rule causing the imposter account to exceed a threshold and the identifying system to execute an action against the identity theft.

Figure 9:
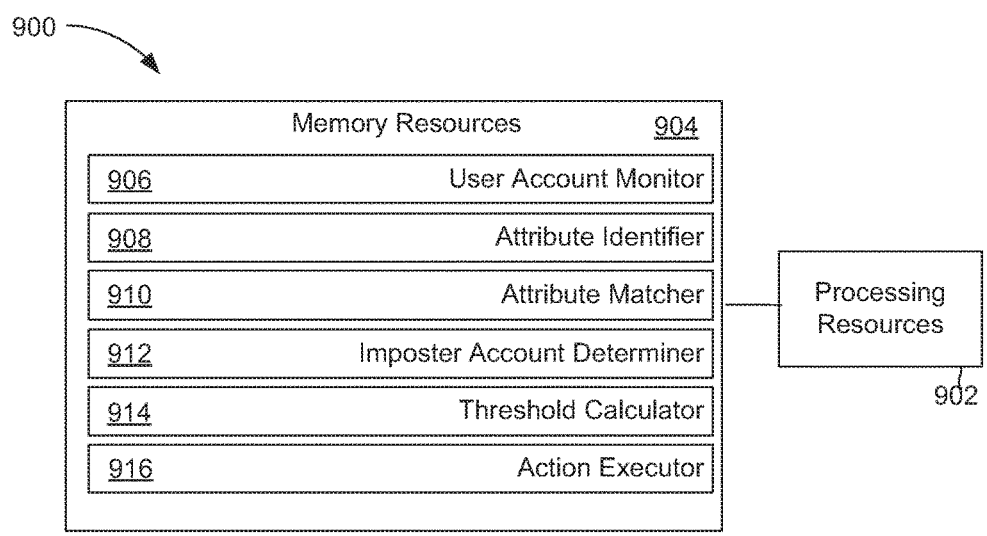
FIG. 9 is a diagram of an example of a system for identifying an imposter account in a social network, according to the principles described herein.

FIG. 9 is a diagram of an example of an identifying system (900), according to the principles described herein. In this example, the identifying system (900) includes processing resources (902) that are in communication with memory resources (904). Processing resources (902) include at least one processor and other resources used to process programmed instructions. The memory resources (904) generally represent any memory capable of storing data, such as programmed instructions or data structures used by the identifying system (900). The programmed instructions shown stored in the memory resources (904) include a user account monitor (906), an attribute identifier (908), an attribute matcher (910), an imposter account determiner (912), a threshold calculator (914), and an action executor (816).

The memory resources (904) include a computer readable storage medium that contains computer readable program code to cause tasks to be executed by the processing resources (902). The computer readable storage medium may be a tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, other types of memory, or combinations thereof.

The user account monitor (906) represents programed instructions that, when executed, cause the processing resource (902) to monitor user accounts of a social network. The attribute identifier (908) represents programmed instructions that, when executed, cause the processing resource (902) to identify attributes associated with each of the user accounts of the social network.

The attribute matcher (910) represents programed instructions that, when executed, cause the processing resource (902) to match attributes associated with each of the user accounts of the social network. The imposter account determiner (912) represents programed instructions that, when executed, cause the processing resource (902) to determine, based on matching the attributes associated with each of the user accounts of the social network, when at least one of the user accounts is an imposter account associated with identity theft of a victim account.

The threshold calculator (914) represents programed instructions that, when executed, cause the processing resource (902) to calculate the threshold, the threshold indicating a number of rules that are to be triggered before executing the at least one action. The action executor (916) represents programed instructions that, when executed, cause the processing resource (902) to execute, based on a threshold, at least one action against the identity theft of the victim account by the imposter account.

The identifying system (900) of FIG. 9 may be part of a general purpose computer. However, in alternative examples, the identifying system (900) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicates otherwise. It will be further understood that the terms "comprises" and/or "comprising," when used in the specification, specify the presence of stated features, integers, operations, elements, and/or components, but do not preclude the presence or addition of a number of other features, integers, operations, elements, components, and/or groups thereof.

What is claimed is:

1. A system for identifying an imposter account in a social network, the system comprising a server to connect with the social network, the server comprising:
   a processor;
   memory accessible to the processor;
   an interface for the processor to communicate with the social network;
   wherein the processor, using the memory, implements all of:
   a monitoring engine to monitor user accounts of a social network;
   an identifying engine to identify attributes associated with each of the user accounts of the social network so that certain identifying attributes are collected for all the user accounts of the social network;
   a matching engine to match the identifying attributes associated with each of the user accounts of the social network against those of all the other user accounts of the social network to identify any matching attributes indicative of a duplication between two user accounts of the social network;
   a determining engine to determine, based on matching the identifying attributes associated with two user accounts of the social network, when at least one of the user accounts is suspected to be an imposter account associated with identity theft of a victim account regardless of whether the suspected imposter account has yet been used to attempt any fraudulent act;
   a threshold calculator to calculate a threshold indicating a number of rules that are to be triggered before executing an authentication process; and
   an executing engine to execute an authentication process of the suspected imposter account to prevent the identity theft of the victim account by the suspected imposter account.

2. The system of claim 1, in which the attributes comprise user names, electronic mail (email) addresses, user profile pictures, user residences, employment histories, user education, user preferences, life events, account age, social contacts, or combinations thereof.

3. The system of claim 1, in which the determining engine determines, based on matching the attributes associated with each of the user accounts of the social network, when at least one of the user accounts is an imposter account associated with the identity theft of the victim account by determining a number of rules which are to be triggered to determine when at least one of the user accounts is the imposter account.

4. The system of claim 1, in which the authentication process is triggered when a plurality of rules are satisfied based on activity of the imposter account.

5. The system of claim 1, in which the monitoring engine monitors the user accounts of the social network by monitoring a user name and electronic mail (email) address associated with each user accounts of the social network.

6. A computer program product for identifying an imposter account in a social network, the computer program product comprising:
a tangible, non-transitory computer readable storage medium, the computer readable storage medium comprising computer readable program code embodied therewith, the computer readable program code comprising program instructions that, when executed, causes a processor to:
monitor user accounts of a social network;
identify attributes associated with each of the user accounts of the social network so that certain identifying attributes are collected for all the user accounts of the social network;
match the identifying attributes associated with each of the user accounts of the social network against those of all the other user accounts of the social network to identify any matching attributes indicative of a duplication between two user accounts of the social network;
determine, based on matching the identifying attributes associated with two user accounts of the social network, when at least one of the user accounts is suspected of being an imposter account associated with identity theft of a victim account regardless of whether the suspected imposter account has yet been used to attempt any fraudulent act;
calculate a threshold indicating a number of rules that are to be triggered before executing an authentication process; and
execute an action against the suspected imposter account in response to the suspected imposter account initiating an activity with a connection of the victim account.

7. The computer program product of claim 6, further comprising computer readable program code comprising program instructions that, when executed, cause the processor to establish a plurality of rules that are to be triggered before executing the action against the suspected imposter account.

8. The computer program product of claim 7, wherein one of the rules is triggered in response to the suspected imposter account initiating a chat that appears to be from the victim account.

9. The computer program product of claim 6, in which the attributes comprise user profile pictures.

10. The computer program product of claim 6, further comprising computer readable program code comprising program instructions that, when executed, cause the processor to monitor user names associated with the user accounts and monitor electronic mail (email) address associated with the user accounts.

11. A method for identifying an imposter account in a social network, the method comprising operating a computer, comprising a hardware processor, that is:
monitoring user accounts of a social network;
identifying attributes associated with each of the user accounts of the social network so that certain identifying attributes are collected for all the user accounts of the social network;
based on matching the identifying attributes associated with each of the user accounts of the social network against those of all the other user accounts of the social network to identify any matching attributes indicative of a duplication between two user accounts of the social network, determining whether at least one of the user accounts is suspected to be an imposter account associated with identity theft of a victim account regardless of whether the suspected imposter account has yet been used to attempt any fraudulent act;
calculate a threshold indicating a number of rules that are to be triggered before executing an authentication process; and
executing an authentication process of the suspected imposter account to prevent the identity theft of the victim account by the suspected imposter account.

12. The method of claim 11, wherein the authentication process is triggered by a request for a chat by the suspected imposter account that appears to be from the victim account.

13. The method of claim 11, in which the attributes comprises all of user names, electronic mail (email) addresses, and user profile pictures.

14. The method of claim 11, the method further comprising triggering the authentication process in response to a plurality of rules being satisfied.

15. The method of claim 11, further comprising adjusting a number of rules which are to be satisfied to determine when at least one of the user accounts is the imposter account to reduce false positive and false negative determinations of an imposter account.

16. The method of claim 11, in which monitoring the user accounts of the social network comprises:
monitoring user names associated with the user accounts; and
monitoring electronic mail (email) addresses associated with the user accounts.

17. A system for identifying an imposter account in a social network, the system comprising a server to connect with the social network, the server comprising:
a processor;
memory accessible to the processor;
an interface for the processor to communicate with the social network;
wherein the processor, using the memory, implements all of:
a monitoring engine to monitor user accounts of a social network, including during creation of user accounts;
an identifying engine to identify attributes associated with each of the user accounts of the social network so that certain identifying attributes are collected for all the user accounts of the social network;
a matching engine to match the identifying attributes associated with each of the user accounts of the social network against those of all the other user accounts of the social network to identify any matching attributes indicative of a duplication between two user accounts of the social network;

a determining engine to determine, based on matching the identifying attributes associated with two user accounts of the social network, when at least one of the user accounts is suspected to be an imposter account associated with identity theft of a victim account regardless of whether the suspected imposter account has yet been used to attempt any fraudulent act;

a threshold calculator to calculate a threshold indicating a number of rules that are to be triggered before executing an authentication process; and an executing engine, based on a number of rules that are triggered exceeding the calculated threshold, to execute an authentication process of the suspected imposter account to prevent the identity theft of the victim account by the suspected imposter account.

18. The system of claim 17, in which the attributes comprise user names, electronic mail (email) addresses, user profile pictures, user residences, employment histories, user education, user preferences, life events, account age, social contacts, or combinations thereof.

19. The system of claim 17, in which the monitoring engine monitors the user accounts of the social network by monitoring user names and electronic mail (email) address associated with the user accounts of the social network.

20. The system of claim 17, in which the executing engine executes, based on the authentication process, action against the identity theft of the victim account by the imposter account by suspending the imposter account.

* * * * *